United States Patent
Nicholas et al.

(10) Patent No.: US 12,102,199 B1
(45) Date of Patent: Oct. 1, 2024

(54) PROTECTIVE COVER FOR A LAPTOP COMPUTER

(71) Applicant: MAX Interactive, Inc., Irvine, CA (US)

(72) Inventors: Sean Nicholas, San Clemente, CA (US); Albert George Giazzon, Mesa, AZ (US)

(73) Assignee: MAX Interactive, Inc., Irvine, CA (US)

( * ) Notice: Subject to any disclaimer, the term of this patent is extended or adjusted under 35 U.S.C. 154(b) by 0 days.

(21) Appl. No.: 18/736,984

(22) Filed: Jun. 7, 2024

Related U.S. Application Data

(63) Continuation of application No. 18/589,077, filed on Feb. 27, 2024, now abandoned, which is a continuation-in-part of application No. 18/104,968, filed on Feb. 2, 2023, which is a continuation of application No. 17/742,911, filed on May 12, 2022.

(51) Int. Cl.
*A45C 11/00* (2006.01)
*G06F 1/16* (2006.01)

(52) U.S. Cl.
CPC ............ *A45C 11/00* (2013.01); *G06F 1/1628* (2013.01); *A45C 2011/003* (2013.01); *G06F 1/1616* (2013.01); *G06F 2200/1633* (2013.01)

(58) Field of Classification Search
CPC ............. A45C 11/00; A45C 2011/003; A45C 2011/001; A45C 2011/002; A45C 11/38; A45C 11/10; A45C 11/08; A45C 13/002; G06F 1/1616; G06F 1/181; G06F 1/1628; G06F 2200/1633

USPC ..................................... 361/679.02; 206/320
See application file for complete search history.

(56) References Cited

U.S. PATENT DOCUMENTS

| | | | |
|---|---|---|---|
| 5,632,373 A | 5/1997 | Kumar et al. | |
| 5,682,993 A | 11/1997 | Song | |
| 5,835,344 A | 11/1998 | Alexander | |
| 6,149,001 A | 11/2000 | Akins | |
| 6,480,377 B2 | 11/2002 | Genest et al. | |
| 7,643,274 B2 | 1/2010 | Bekele | |
| 7,907,400 B2 | 3/2011 | Bekele | |
| 8,139,348 B2 | 3/2012 | Ruch et al. | |

(Continued)

OTHER PUBLICATIONS

Joe Pearce, "Rugged Macbook Ait 13 Case Install Tutorial," Jan. 10, 2018, 5 pages, UZBL LLC, https://www.youtube.com/watch?v=iQHmAVZUM6w.

(Continued)

*Primary Examiner* — Rafael A Ortiz
(74) *Attorney, Agent, or Firm* — Eric Karich; Karich & Associates

(57) ABSTRACT

A protective cover for a laptop computer has a top cover having a planar top body made of acrylic that extends to an outer perimeter, the outer perimeter being made of thermoplastic polyurethane having a durometer of 85-90D. A downwardly extending wall extends downwardly from the top edge and the pair of side edges of the outer perimeter. A slide rail extends inwardly from the downwardly extending wall at the pair of side edges, wherein the planar top body, the downwardly extending wall, and the slide rails together are sized and shaped to slidingly receive the screen portion of the laptop computer when the screen portion is inserted from the bottom edge.

1 Claim, 4 Drawing Sheets

(56) References Cited

U.S. PATENT DOCUMENTS

| | | | |
|---|---|---|---|
| 8,289,703 | B2 | 10/2012 | Bekele |
| 8,638,555 | B2 | 1/2014 | Bekele |
| 8,817,467 | B2 | 8/2014 | Ore Yang et al. |
| 10,234,898 | B2 | 3/2019 | Bekele |
| D892,803 | S | 8/2020 | Armstrong et al. |
| 10,845,844 | B1 * | 11/2020 | Chan .................... G06F 1/1628 |
| 10,884,453 | B2 | 1/2021 | Armstrong |
| 10,928,854 | B1 * | 2/2021 | Fenton ................ H04B 1/3888 |
| 10,948,943 | B2 | 3/2021 | Roberts et al. |
| 11,029,727 | B1 | 6/2021 | Chan et al. |
| 11,402,876 | B1 | 8/2022 | Lennox et al. |
| 11,487,320 | B1 * | 11/2022 | Giazzon ............... G06F 1/1613 |
| 11,659,907 | B2 | 5/2023 | Matthews, Jr. et al. |
| 2002/0080567 | A1 | 6/2002 | Bone et al. |
| 2005/0200608 | A1 | 9/2005 | Ulla et al. |
| 2007/0227923 | A1 | 10/2007 | Kidakarn |
| 2008/0308437 | A1 | 12/2008 | Lin |
| 2009/0234975 | A1 | 9/2009 | Chang et al. |
| 2012/0081876 | A1 | 4/2012 | Kaneko |
| 2014/0098476 | A1 | 4/2014 | Severson et al. |
| 2016/0338459 | A1 | 11/2016 | Yow et al. |
| 2017/0049199 | A1 * | 2/2017 | Kim ....................... A45C 11/00 |
| 2019/0090050 | A1 | 3/2019 | Rema Shanmugam et al. |
| 2019/0227592 | A1 | 7/2019 | Fenton et al. |
| 2021/0048847 | A1 | 2/2021 | Fenton et al. |
| 2021/0165450 | A1 | 6/2021 | Chan et al. |
| 2022/0057840 | A1 | 2/2022 | Ho et al. |

OTHER PUBLICATIONS

2019 Catalog, 2019, 15 pages, Gumdrop Cases, https://www.gumdropcases.com/blogs/new-2019-catalog-available/.

2018 Catalog, 2018, 8 pages, Gumdrop Cases, https://www.gumdropcases.com.

"Installing UZBL Case (Rugged Shell) on Acer Spin 11 Chromebook," Jan. 14, 2019, 5 pages, UZBL LLC, https://www.youtube.com/watch?v=OvJloZu6-bA.

Joe Pearce, "Rugged Hard Shell Case," Jul. 2019, 13 pages, UZBL LLC, https://uzbl.com/products/acer-chromebook-spin-11-r752-case.

* cited by examiner

PROTECTIVE COVER FOR A LAPTOP COMPUTER

CROSS-REFERENCE TO RELATED APPLICATIONS

This application for a utility patent is a continuation of a previously filed utility patent application, still pending, having the application Ser. No. 18/589,077, filed Feb. 27, 2024, which is a continuation-in-part of a previously filed utility patent application, still pending, having the application Ser. No. 18/104,968, filed Feb. 2, 2023, which is a continuation of a previously filed utility patent application, still pending, having the application Ser. No. 17/742,911, filed May 12, 2022.

BACKGROUND OF THE INVENTION

Field of the Invention

This invention relates generally to protective covers, and more particularly to a protective cover for use with a laptop computer.

Description of Related Art

The prior art teaches many forms of covers for computers and computer components.

Song, U.S. Pat. No. 5,682,993, teaches a protective cover for a laptop computer that is held in place with a plurality of tabs which extend outwardly from the perimeter of the case to engage a top surface of the computer. The tabs allows the cover to be snapped onto the computer quickly and easily.

Similar cases are also shown in Bekele, U.S. Pat. No. 7,643,274, and related patents U.S. Pat. Nos. 7,907,400, 8,289,703, 8,638,555, and 10,234,898. These patents teach the use of tabs similar to Song, and also teach the separation of the case into two separate parts, an upper case and a lower case, which are not connected to each other, as they are in Song.

The prior art teaches the use of a plurality of tabs for clipping the cover onto a laptop computer. However, we have found that a slide mountable cover is more effective in protecting the laptop, and the anticipated problems of the cover sliding off were overcome with the current product design. Thus a long-felt need in the art may be met with the current superior design that overcomes the barriers that were initially anticipated by the teachings of the prior art.

The slide mounted cover also overcomes one of the major problems of the tab-based cases. Tab-based cases have a tendency to damage the laptop computer when they are pulled off of the laptop computer, the tabs can separate the bezel from the display screen. The current sliding system eliminates the forces that can damage a laptop computer. The slide mounted cover overcomes challenges with some computer designs where the display screen can separate from the bezel based on the force of the clips being snapped off the device. Sliding the cover on and off eliminates the outward pressure when removing the clips from the display portion of the device. The present invention fulfills these needs and provides further advantages as described in the following summary.

SUMMARY OF THE INVENTION

The present invention teaches certain benefits in construction and use which give rise to the objectives described below.

The present invention provides a protective cover for a laptop computer. The protective cover comprises a top cover having a planar top body made of acrylic that extends to an outer perimeter made of thermoplastic polyurethane having a durometer of 85-90D. A downwardly extending wall extends downwardly from a top edge and a pair of side edges of the outer perimeter. A slide rail extends inwardly from the downwardly extending wall at the pair of side edges, wherein the planar top body, the downwardly extending wall, and the slide rails together are sized and shaped to slidingly receive the screen portion of the laptop computer when the screen portion is inserted from the bottom edge.

A primary objective of the present invention is to provide a protective cover having advantages not taught by the prior art.

Another objective is to provide a protective cover that includes a top cover that slides onto the laptop computer, rather than snapping on over a plurality of tabs.

Another objective is to provide a protective cover that includes a top cover having a planar top body made of acrylic that extends to an outer perimeter made of thermoplastic polyurethane having a durometer of 85-90D. The thermoplastic polyurethane construction of the outer perimeter, with this particular hardness, including a slide rail, function to provide sufficient friction to prevent the top cover from falling off the laptop, even when the top cover is completely disconnected from the bottom cover, and the top and bottom covers are not connected with a connector hinge or equivalent connecting component.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a protective cover for a laptop computer.

Figure 1:
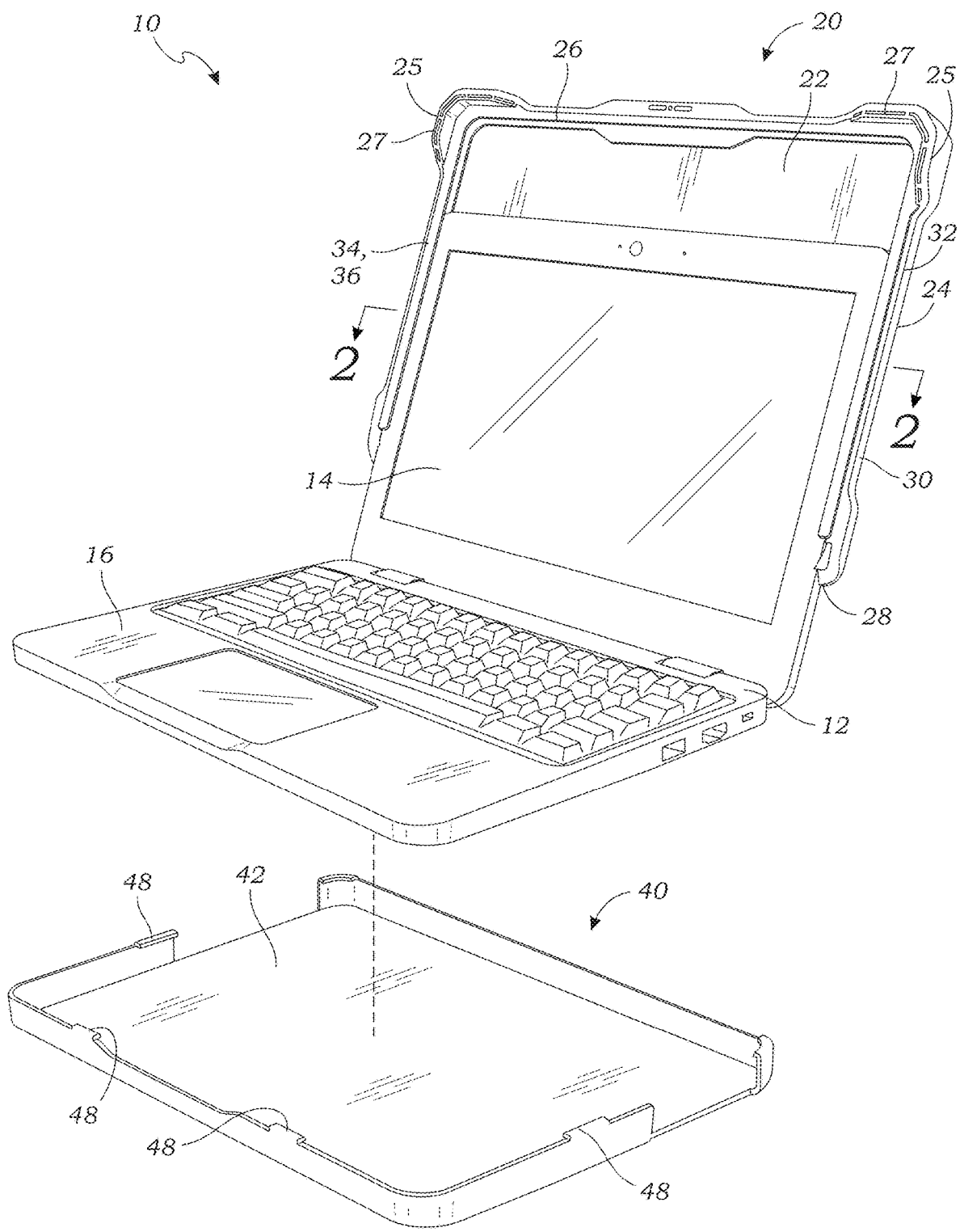
FIG. 1 is an exploded top perspective view of a protective cover for a laptop computer according to one embodiment of the present invention.
Figure 2:
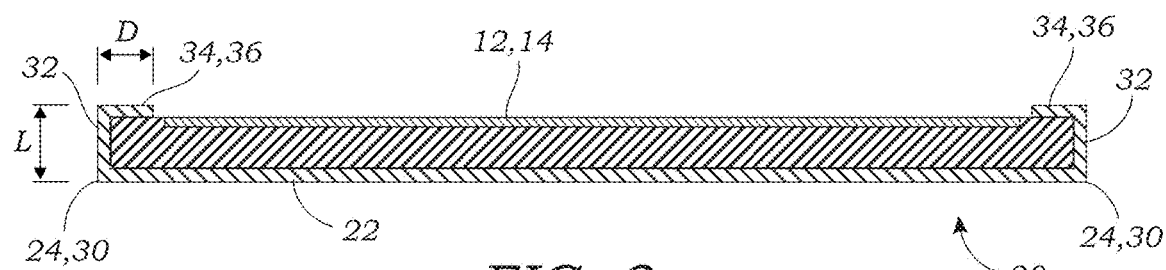
FIG. 2 is a sectional view thereof taken along line 2-2 in FIG. 1.
Figure 3:
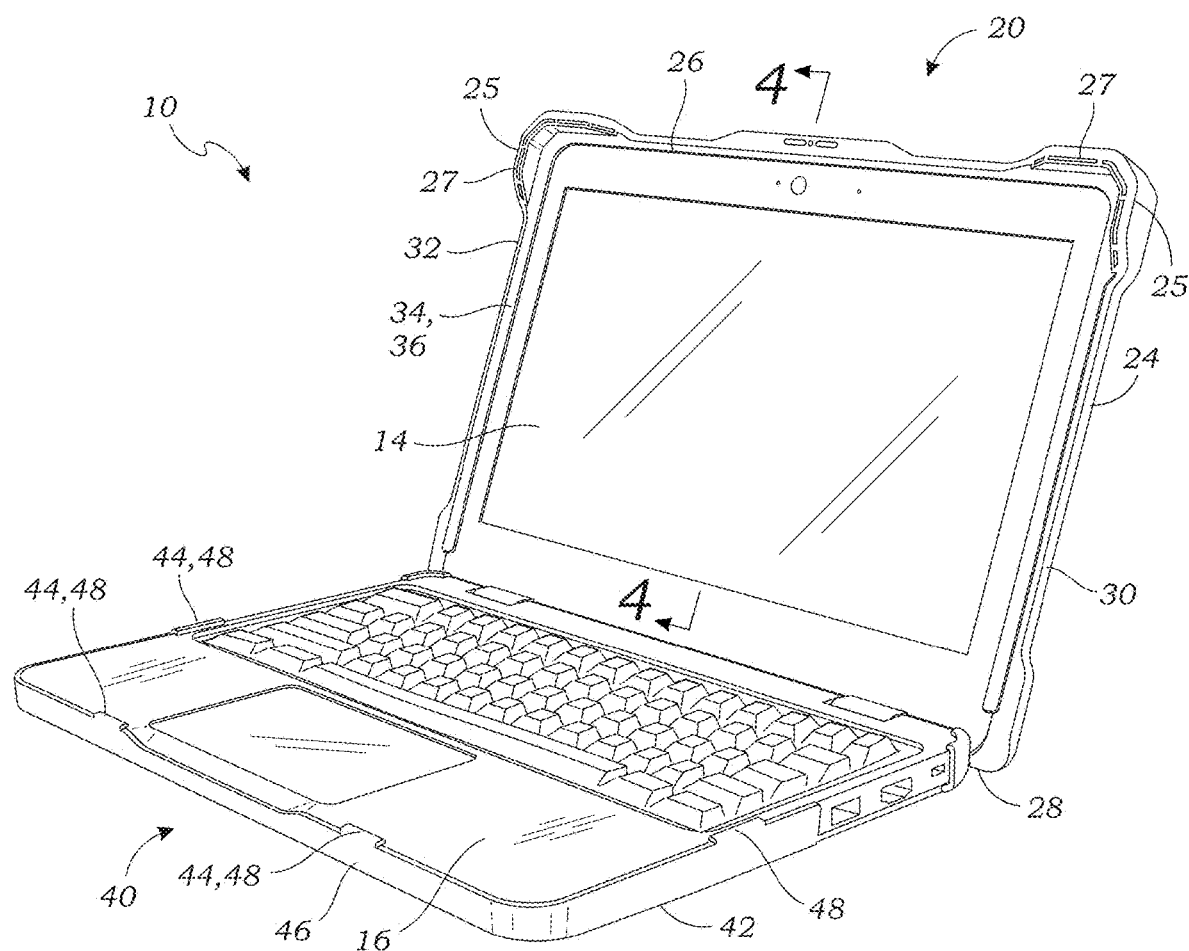
FIG. 3 is a perspective view of the laptop computer once the protective cover has been fully mounted on the laptop computer.
Figure 4:
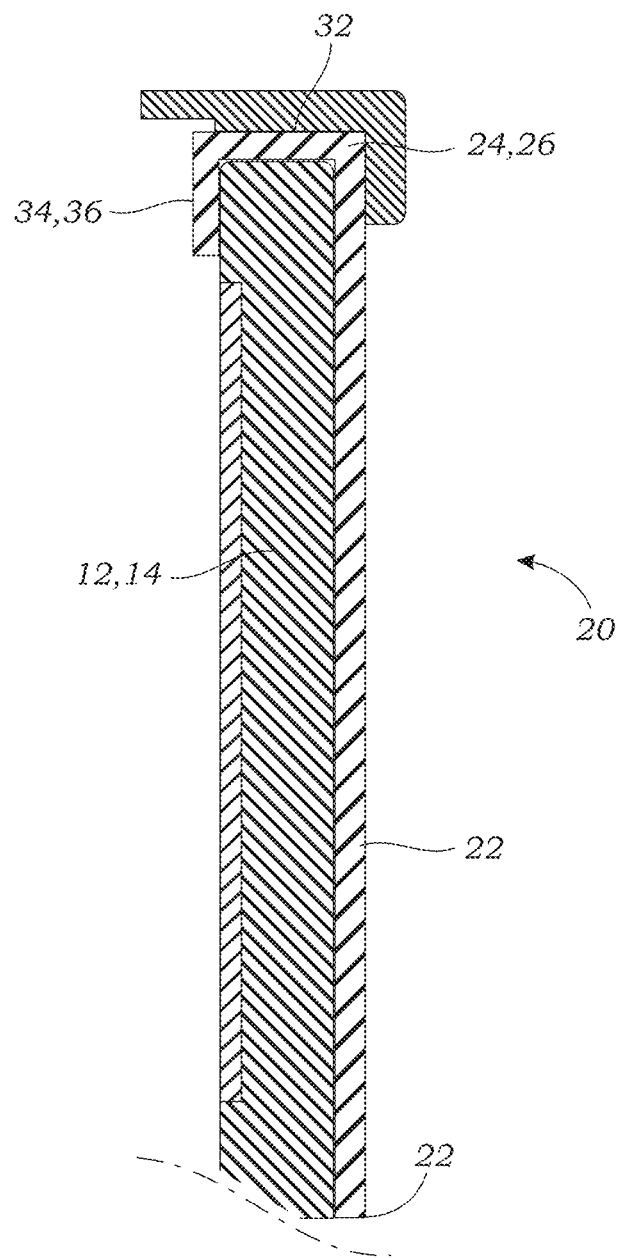
FIG. 4 is a sectional view thereof taken along line 4-4 in FIG. 3.

FIG. 1 is an exploded top perspective view of a protective cover 10 for a laptop computer 12 according to one embodiment of the present invention. FIG. 2 is a sectional view thereof taken along line 2-2 in FIG. 1. FIG. 3 is a perspective view of the laptop computer 12 once the protective cover 10 has been fully mounted on the laptop computer 12. FIG. 4 is a sectional view thereof taken along line 4-4 in FIG. 3.

As shown in FIGS. 1-3, the protective cover 10 is adapted to protect both a screen portion 14 and a keyboard portion 16 of the laptop computer 12. The protective cover 10 includes a top cover 20 for protecting the screen portion 14, and a bottom cover 40 for protecting the keyboard portion 16. In this embodiment, the top cover 20 and the bottom cover 40 are not connected to each other, but in other embodiments a connection such as a spine or hinge portion (not shown) may be implemented. The protective cover 10 is formed to afford protection from falls and environmental concerns and may be of any appropriate size to receive and encase various sizes of laptop computers.

In this embodiment, the top cover 20 includes a planar top body 22 that extends to an outer perimeter 24, the outer perimeter 24 having a top edge 26 and a bottom edge 28 connected by a pair of side edges 30. The top cover 20 further includes a downwardly extending wall 32 which extends downwardly from the top edge 26 and the pair of side edges 30 of the outer perimeter 24 but is not provided at the bottom edge 28. Further, a slide rail 34 extends inwardly from the downwardly extending wall 32 at the top edge 26 (shown best in FIG. 4) and the pair of side edges 30 (shown best in FIG. 2), altogether forming a single integral flange 36.

As shown in FIGS. 1-4, the planar top body 22, the downwardly extending wall 32, and the integral flange 36 together are sized and shaped to slidingly receive the screen portion 14 of the laptop computer 12 when the screen portion 14 is inserted from the bottom edge 28 under the integral flange 36.

In this embodiment, the planar top body 22 is made of acrylic, which extends to an outer perimeter 24 made of thermoplastic polyurethane. In this embodiment, the thermoplastic polyurethane of the outer perimeter 24 has a durometer of 85-90D. The thermoplastic polyurethane construction of the outer perimeter 24, which includes the slide rail 34, function to provide sufficient friction to prevent the top cover from falling off the laptop, even when the top cover is completely disconnected from the bottom cover, and the top and bottom covers are not connected with a connector hinge or equivalent connecting component.

As best shown in FIG. 2, the downwardly extending wall 32 extends a length L that is approximately equal to or slightly greater than the thickness of the screen portion 14 of the laptop computer 12 but is short enough for the integral flange 36 to retain the screen portion 14 without gapping. The integral flange 36 extends inwardly a distance D that is great enough to retain the screen portion 14 so that it does not snap out of the top cover 20, but must be slid off via the bottom edge 28. In this embodiment, the downwardly extending wall 32 has a length L, and the slide rails 34 extend a distance D, that are together sized and shaped to slidingly receive the screen portion 14 of the laptop computer 12 while frictionally engaging the screen portion 14 so that the top cover 20 does not slide off without considerable force being applied. These components may be constructed of or coated with a softer TPU or other equivalent material that further contributes friction to prevent inadvertent removal. For purposes of this application, the terms "frictionally engaging" and "substantial force" are defined to include enough friction so that the top cover 20 does not come off absent considerable sustained force being applied by a user, consistent with an intentional effort by a user to pull off the cover, but low enough friction so that a user can remove the top cover 20 with the application of continuous mechanical force without requiring the use of tools, and without undue strain on the user. Furthermore, the frictional engagement should be strong enough that gravity and general impact forces that might be imparted through accidental contacts while in general use are not sufficient to remove the top cover 20, as in, the continuous flange 36 will not allow the top cover 20 to come off through general impact.

As best shown in FIG. 4, the slide rail 34 and the integral flange 36 at the top edge 26 are similarly sized and configured, as described above.

As shown in FIG. 1, in some embodiments, the top cover 20 further includes resilient corners 25 to further protect the laptop computer 12 in case of a fall. In this embodiment, the resilient corners 25 include a set of clefts 27 on the inner edge of the corners 25, thereby providing further protection to the laptop 12.

As shown in FIGS. 1-4, in this embodiment, the bottom cover 40 comprises a planar bottom body 42, an upwardly extending wall 46 extending upwardly from the planar bottom body 42, and a means for mounting 44 the bottom cover 40 onto the keyboard portion 16. In this embodiment, as shown in FIGS. 1 and 3, the means for mounting 44 includes a plurality of tabs 48 extending inwardly from the upwardly extending wall 46 to clip onto the keyboard portion 16 of the laptop computer 12. The tabs 48 should extend inwardly only a small amount, so that the cover 40 can be snapped into the cover 40 from above.

Figure 5:
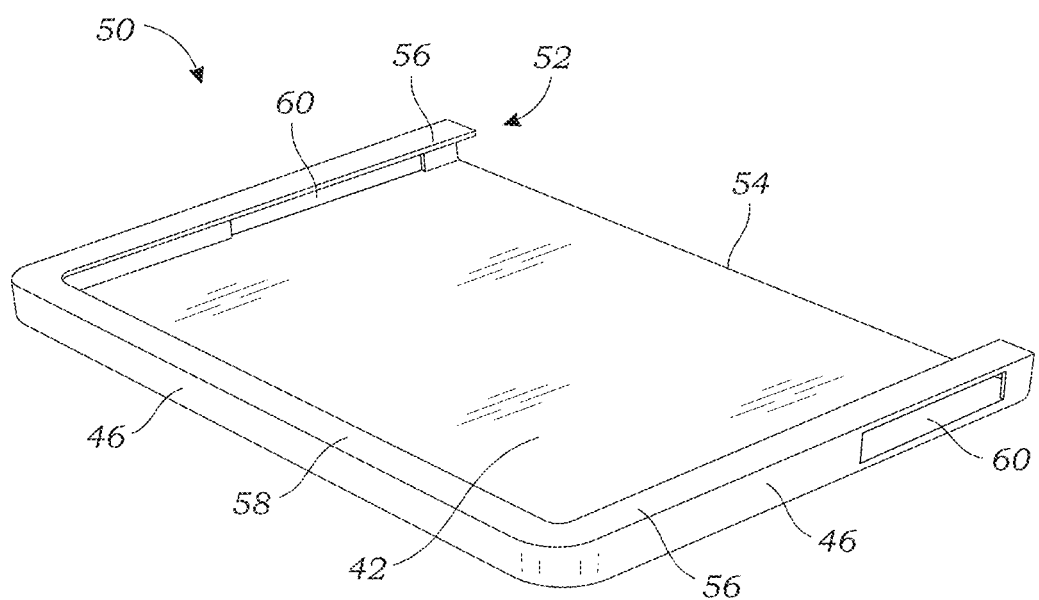
FIG. 5 is a perspective view of a second embodiment of a bottom cover of the protective cover.

In other embodiments, as shown in the example of FIG. 5, the means for mounting 44 may alternatively be any other suitable means known in the art, e.g., a hook and loop fastener or other form of mechanical fastener, or a chemical fastener such as an adhesive, disposed on the planar bottom body 42 and/or the upwardly extending wall 46, etc., or any other means known to those skilled in the art.

FIG. 5 is a perspective view of a second embodiment 50 of the bottom cover of the protective cover 10. As shown in FIG. 5, in this embodiment, the bottom cover 50 of this embodiment includes an alternative means for mounting 52 the bottom cover 50 onto the keyboard portion 16 of the laptop computer 12. The means for mounting 52 of this embodiment is a similar mechanism as the top cover 20 of FIGS. 1-4, wherein the upwardly extending wall 46 of the bottom cover is excluded from a rear portion 54 of the bottom cover 50, and does not include the inwardly extending tabs 48. Instead, a slide rail 56 extends inwardly from the upwardly extending wall 46, altogether forming a single integral flange 58.

As shown in FIG. 5, the planar bottom body 42, the upwardly extending wall 46, and the integral flange 58 together are sized and shaped to slidingly receive the keyboard portion 16 of the laptop computer 12 when the keyboard portion 16 is inserted from the rear portion 54 under the integral flange 58.

In this embodiment, as illustrated, the frictional engagement of the bottom cover 40 and 50 with the keyboard portion 16 of the laptop computer 12 should be adapted to be disassembled using manual force by hand, but be strong enough that the bottom cover 40/50 does not pull away from the keyboard portion 16 during use.

In some embodiments, as shown in FIG. 5, the top cover 20 and/or the bottom cover 40/50 of the protective cover 10 may further include portions 60 which allow access to inputs such as a disk drive, USB port, "home" button, or any other features requiring access to the laptop computer known to those skilled in the art. In other embodiments, additional clips, tabs, receivers, etc. may also be included in the top cover 20 and/or bottom cover 40/50, which should be considered within the scope of the present invention.

In some embodiments, the protective cover 10 may be constructed of a rigid material such as polycarbonate, plastic, etc., but other suitable materials may be used for optimally protecting the laptop computer 12, e.g., polyethylene terephthalate (PET), laminated tempered glass, acrylic, thermoplastic polyurethane (TPU), thermoplastic elastomer (TPE), and/or other suitable flexible materials (e.g., silicone, soft plastic, rubber, etc.).

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A protective cover for a laptop computer having a screen portion and a keyboard portion, the protective cover comprising:
   a top cover having a planar top body that extends to an outer perimeter, the planar top body being constructed of acrylic;
   the outer perimeter having a top edge and a bottom edge connected by a pair of side edges, a downwardly extending wall which extends downwardly from the top edge and the pair of side edges of the outer perimeter but is not provided at the bottom edge, and a slide rail which extends inwardly from the downwardly extending wall at the top edge and the pair of side edges, forming an integral flange;
   wherein the outer perimeter is constructed of thermoplastic polyurethane;
   wherein the outer perimeter, including the planar top body, the downwardly extending wall, and the integral flange, together are sized and shaped to slidingly receive the screen portion of the laptop computer when the screen portion is inserted from the bottom edge under the integral flange, and they together frictionally engage the screen portion of the laptop computer so that the top cover does not slide off without considerable sustained force being applied consistent with an intentional effort by a user to pull off the cover, but low enough friction so that a user can remove the top cover with the application of continuous mechanical force without requiring the use of tools, such that the top cover and the bottom cover are able to remain disconnected from each other, without any form of connecting hinge, during use while the protective cover is mounted on the laptop and being operated;
   wherein the thermoplastic polyurethane of the outer perimeter has a durometer of 85-90D; and
   a bottom cover having a planar bottom body and a means for mounting the planar bottom body onto the keyboard portion.

* * * * *